> United States Patent Office 3,391,138
Patented July 2, 1968

3,391,138
CERTAIN 1-SUBSTITUTED-BENZODIAZEPIN-
2-ONE COMPOUNDS
Giles A. Archer, Essex Fells, and Leo Henryk Sternbach,
Upper Montclair, N.J., assignors to Hoffmann-La Roche
Inc., Nutley, N.J., a corporation of New Jersey
No Drawing. Continuation-in-part of application Ser. No.
389,469, Aug. 13, 1964. This application July 22, 1965,
Ser. No. 474,159
12 Claims. (Cl. 260—239.3)

ABSTRACT OF THE DISCLOSURE 5-aryl-1,4-benzodiazepines substituted in position-1 with (1) a lower alkyl-oxy-lower alkylene group, (2) a lower alkanoyl-oxy-lower alkyl group and (3) a substituted

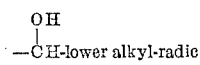

Such compounds are useful as muscle relaxants, sedatives and anticonvulsants. They are prepared by a procedure which involves the step of treating a corresponding benzodiazepine bearing hydrogen in position-1 with an appropriately substituted halide whereby to yield the corresponding compounds which are substituted as in (1), (2), and (3) above.

---

This application is a continuation-in-part of Ser. No. 389,469, filed Aug. 13, 1964, now abandoned, in the names of Giles A. Archer and Leo Henryk Sternbach.

The present invention relates to novel derivatives of 5-aryl-1,4-benzodiazepines and intermediates therefore and processes for making the foregoing. More specifically, the present invention relates to novel 1-substituted 5-aryl-1,4-benzodiazepines.

The said novel 1-substituted-5-aryl-1,4-benzodiazepines and derivatives thereof to which the invention relates are selected from the group consisting of a compound of the formula

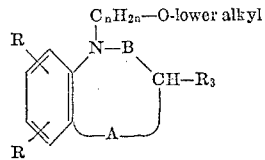

a compound of the formula

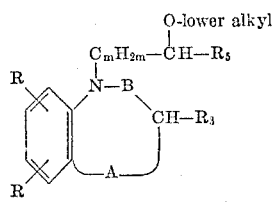

a compound of the formula

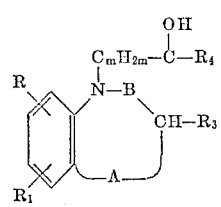

and acid addition salts thereof with pharmaceutically acceptable acids wherein $n$ is a whole integer from 2–7, $m$ is a whole integer from 1–7; A is selected from the group consisting of

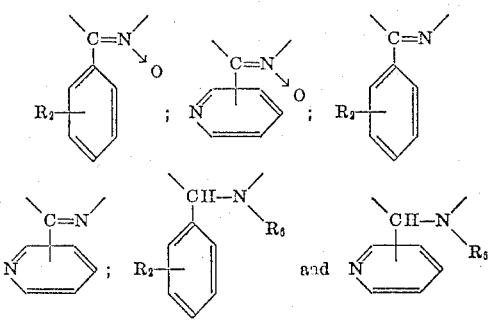

B is a member selected from the group consisting of carbonyl and methylene; R, $R_1$ and $R_2$ are members selected from the group consisting of halogen, hydrogen, trifluoromethyl, nitro, lower alkyl, amino and cyano; $R_3$ is a member selected from the group consisting of hydrogen and lower alkyl; $R_4$ is a member selected from the group consisting of lower alkyl, preferably a lower alkyl group having 1–4 carbon atoms in the chain, and $R_7$-phenyl wherein $R_7$ is a member selected from the group consisting of hydrogen, halogen, lower alkoxy, trifluoromethyl, nitro, lower alkyl and amino, preferably, hydrogen; $R_5$ is a member selected from the group consisting of hydrogen, lower alkyl and $R_7$-phenyl wherein $R_7$ is as above and $R_6$ is a member selected from the group consisting of hydrogen and lower alkyl. In a preferred embodiment, R in Formulas Ia, Ib and Ic above is hydrogen. In a particularly preferred embodiment, R in Formulas Ia, Ib and Ic above is hydrogen and $R_1$ is positioned on the fused phenyl portion of the benzodiazepine nucleus at the 7-position thereof.

The term "lower alkyl" as employed herein is intended to designate both straight and branched chain hydrocarbon groups such as methyl, ethyl, isobutyl and the like. The expression "$C_nH_{2n}$" as used throughout the instant disclosure is intended to connote both divalent straight and divalent branched chain hydrocarbon groups having from 2–7 carbon atoms in the chain such as ethylene, propylene, trimethylene, ethylethylene, tetramethylene and the like. The expression "$C_mH_{2m}$" as employed in the instant application similarly represents both a divalent straight and a divalent branched hydrocarbon chain having 1–7 carbon atoms in the chain such as methylene, ethylene, methyl ethylene, propylene, tetramethylene and the like. The term "halogen" as used herein includes all four forms thereof, i.e., chlorine, bromine, fluorine and iodine unless otherwise specified. The term "lower acyl" represents a residue of a lower alkanoic acid (a lower alkanoyl group) such as acetyl, propionyl and the like. The expression "lower alkoxy" as used herein connotes methoxy, ethoxy and the like. The expression "$R_7$ phenyl" comprehends phenyl per se, halophenyl such as chlorophenyl and the like.

One preferred group of compounds within the purview of the present invention are compounds of the formula 1,3 - dihydro - 1 - (lower alkyl - O - $C_nH_{2n}$) - 7 - $R_1$ - 5 - ($R_2$-phenyl)2H-1,4-benzodiazepin-2-one wherein $n$ is a whole integer from 2–7; and $R_1$ and $R_2$ are selected from the group consisting of hydrogen, trifluoromethyl, nitro, lower alkyl, amino and cyano.

Another preferred group of compounds within the purview of the present invention are of the formula

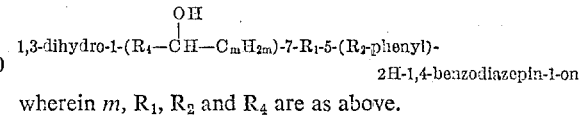

wherein $m$, $R_1$, $R_2$ and $R_4$ are as above.

Also preferred are compounds of the formula 1,3-dihydro-1-(R₅—ĊH—CₘH₂ₘ)-7-R -5-(R₂-phenyl)-
2H-1,4-benzodiazepin-2-one (O-lower alkanoyl group on the CH)

wherein $m$, $R_1$, $R_2$ and $R_5$ are as above.

Especially preferred are compounds of the Formulas Ia, Ib and Ic above wherein R is hydrogen and $R_1$ is selected from the group consisting of hydrogen, halogen, trifluoromethyl and nitro. More preferred are compounds of Formulas Ia, Ib and Ic above wherein R is hydrogen, $R_1$ is selected from the group consisting of hydrogen, halogen, nitro and trifluoromethyl and A is a

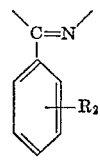

group wherein $R_2$ is hydrogen. When A includes a phenyl group, $R_2$ when other than hydrogen is advantageously joined thereto in the 2-position thereof.

In addition to the compounds of Formulas Ia, Ib and Ic above, as is evident from the above, there are also encompassed within the purview of the present invention, the acid addition salts thereof. The compounds of Formulas Ia, Ib and Ic above form acid addition salts with pharmaceutically acceptable inorganic and organic acids, such as hydrohalic acids, e.g., hydrochloric acid and hydrobromic acid, sulphuric acid, phosphoric acid, nitric acid, tartaric acid, citric acid, camphorsulfonic acid, ethane sulfonic acid, ascorbic acid, salicylic acid, maleic acid and the like.

Compounds of Formulas Ia, Ib and Ic above wherein B is carbonyl and A is

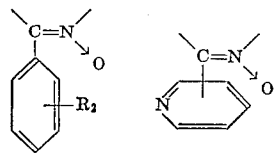

are especially of interest in the preparation of the corresponding compounds of Formulas Ia, Ib and Ic above wherein B is carbonyl and A is

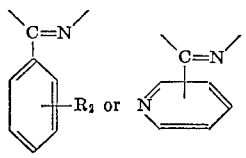

The latter compounds can be prepared by hydrogenation of the former compounds in the presence of a suitable hydrogenation catalyst, such as Raney nickel. Additionally, the last-mentioned compounds of Formulas Ia and Ib can be prepared from compounds of Formulas Ia and Ib having an N-oxide group by treatment with a reducing agent, for example, a phosphorus trihalide such as phosphorus trichloride.

Compounds of Formula Ia above can be prepared from the corresponding 5-aryl-1,4-benzodiazepines wherein the 1-position nitrogen atom is unsubstituted, i.e., bears a hydrogen atom in position-1. For example, compounds of the formula

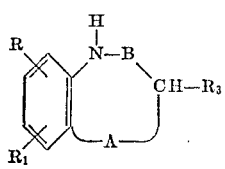

II wherein A, B, R, $R_1$ and $R_3$ are as above can be reacted, preferably after first effecting conversion of the said 1-unsubstituted compounds into their alkali metal derivatives, advantageously, their 1-sodio derivatives, with a compound of the formula $$X\text{—}C_nH_{2n}\text{—O-lower alkyl} \quad \text{III}$$

wherein X is selected from the group consisting of chlorine, bromine and iodine and $n$ is as above.

Compounds of Formula Ic above can be prepared by reacting a compound of the Formula II above, i.e., 5-aryl-1,4-benzodiazepine wherein the 1-position nitrogen atom is unsubstituted, after preferably first effecting conversion of said 1-unsubstituted compounds into an alkali metal derivative thereof, advantageously, a 1-sodio derivative thereof, with a compound of the formula

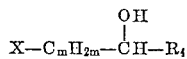

IV wherein X is selected from the group consisting of chlorine, bromine and iodine and $m$ and $R_4$ have the same meaning as above.

The above reactions, i.e., the procedures for the preparation of compounds of the Formulas Ia or Ic above, can be conducted in an inert solvent medium utilizing one or more inert organic solvents such as methanol, ethanol, dimethylformamide, benzene, dimethylsulfoxide-toluene or the like. Where X is exemplified as a halogen atom, it is to be understood that any equivalent leaving group such as mesyloxy, tosyloxy or the like can be present in the compounds of the Formulas III and IV above at X in place of the halogen atom. All that is required of the group X is that it function efficaciously in the process aspect, that is, that it be a suitable leaving group for the purposes of the present invention.

Temperature and pressure are not critical and the reaction can be carried out at room temperature and atmospheric pressure and/or elevated temperatures and/or reduced pressures. Conventional reagents such as sodium methoxide, sodium hydride or the like can be employed to form the 1-alkali metal derivatives such as the 1-sodio derivatives mentioned hereinabove.

Compounds of the Formula I above wherein A is

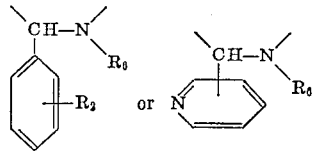

can be prepared from the corresponding compounds of Formula I above wherein A is

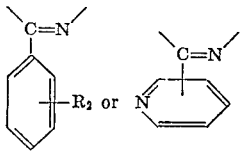

by reduction. For example, the last-mentioned compounds can be reduced with hydrogen in the presence of a suitable hydrogenation catalyst, such as platinum oxide to yield the corresponding compounds wherein $R_6$ is hydrogen and in turn, these compounds can be converted into the corresponding compounds wherein $R_6$ is lower alkyl by the reaction thereof with a lower alkyl halide, such as methyl iodide or a di-lower alkyl sulfate such as dimethyl sulfate.

Another reaction route for preparing compounds of the Formula Ic above involves reducing the carbonyl group in the side chain in position-1 of the formula

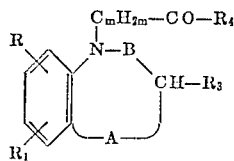

V wherein $m$, A, B, R, $R_1$, $R_3$ and $R_4$ are as above.

The reduction of the ketone radical in position-1 of compounds of Formula V above may be achieved by catalytic hydrogenation, e.g., hydrogenation in the presence of platinum oxide or by treating a compound of the Formula V above with a borohydride or any suitable reducing agent capable of effecting the reduction of the carbonyl group of the substituent in the 1-position of compounds of Formula V above, preferably, selectively. The preferred agents are alkali metal borohydrides, e.g., lithium borohydride, potassium borohydride or most preferably, sodium borohydride. Other borohydrides, such as alkaline earth metal borohydrides, e.g., calcium borohydride or aluminum borohydride may be used as well. Preferably, an organic solvent, such as an ether, e.g., diethylether and tetrahydrofuran and a lower alkanol, e.g., methanol, ethanol and propanol, and the like are employed as the reaction medium when a borohydride is employed to effect the reduction. The reduction can be carried out above, below or at room temperature and if necessary, in the atmosphere of an inert gas such as nitrogen.

Compounds of Formula Ib above can be prepared from compounds of the formula

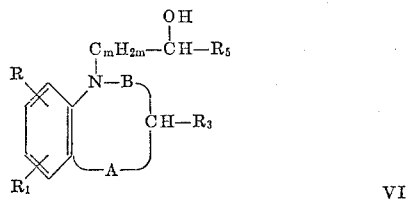

VI wherein $m$, $R$, $R_1$, $R_3$, $R_5$, A and B are as above by esterifying the group in the 1-position of compounds of Formula VI above by conventional esterification techniques. For example, compounds of Formula VI above can be esterified according to known procedures with lower alkanoic acids, anhydrides and halides such as acetic acid, propionic acid, acetic anhydride, propionyl chloride, aectyl chloride and the like to form the corresponding compounds of Formula Ib above.

Compounds of Formulas Ia, Ib and Ic above wherein $R_1$ and/or $R_2$ is nitro can be reduced by conventional techniques, e.g., hydrogenation in the presence of Raney nickel to form the corresponding compound of Formulas Ia, Ib and Ic wherein $R_1$ and/or $R_2$ is amino. The resultant compound, wherein $R_1$ and/or $R_2$ is amino, if desired, can be selectively converted into the corresponding compound wherein $R_1$ and/or $R_2$ is halogen or cyano by the treatment thereof with nitrous acid in the presence of a mineral acid, e.g., hydrochloric acid, followed by treatment of the resultant substance with a strong hydrohalic acid, e.g., hydrochloric acid in the presence of a copper catalyst, e.g., cuprous chloride, in the case where a compound of Formulas Ia, Ib or Ic above wherein $R_1$ and/or $R_2$ is halogen is desired, or cuprous cyanide in the case wherein a compound of Formulas Ia, Ib and Ic above wherein $R_1$ and/or $R_2$ is cyano, is desired.

Compounds of Formulas Ia, Ib and Ic above and their pharmaceutically acceptable acid addition salts are useful as muscle relaxants, sedatives and anticonvulsants. They can be administered internally, for example, parenterally or enterally in conventional pharmaceutical dosage forms. For example, they can be incorporated in conventional liquid or solid vehicles such as water, gelatin, starch, magnesium stearate, talc, vegetable oils and the like to provide tablets, elixers, capsules, solutions, and emulsions, according to acceptable pharmaceutical practice.

The following examples are illustrative but not limitative of the present invention. All temperatures are stated in degrees centigrade.

EXAMPLE 1

To a solution of 0.10 mole of 7-chloro-1,3-dihydro-5-phenyl-2H-1,4-benzodiazepin-2-one in 250 ml. of anhydrous dimethylformamide, there was added 0.11 mole of solid sodium methoxide. After heating the reaction mixture on a steam bath with stirring for 15 minutes and with protection from atmospheric moisture, there was carefully added thereto a solution of 3-bromopropan-1-ol (0.11 mole) in 200 ml. of anhydrous toluene over a period of about 30 minutes. Stirring and heating on the steam bath was continued for a further 1½ hours and then the resultant mixture was concentrated in vacuo at 50–60°. The resulting concentrated solution was poured slowly into a mixture of ice and water (1 l.) whereby the crude product precipitated. The crude product was purified by chromatography of a benzene solution of the crude product over a column of alumina. Evaporation of the eluate and recrystallization of the resulting residue from acetone-petroleum ether (B.P. 30–60°) gave 7-chloro-1,3-dihydro-1-(3-hydroxyropyl) - 5 - phenyl-2H-1,4-benzodiazepin-2-one as white cubes, melting point 156–158°.

EXAMPLE 2

To a solution of 0.10 mole of 7-chloro-1,3-dihydro-5-phenyl-2H-1,4-benzodiazepin-2-one in 250 ml. of anhydrous dimethylformamide, there was added 0.11 mole of solid sodium methoxide. After heating the reaction mixture on a steam bath with stirring for 15 minutes and with protection from atmospheric moisture, there was carefully added thereto a solution of 2-bromoethanol (0.11 mole) in 200 ml. of anhydrous toluene over a period of about 30 minutes. Stirring and heating on the steam bath was continued for a further 1½ hours and then the resultant mixture was concentrated in vacuo at 50–60°. The resulting concentrated solution was poured slowly into a mixture of ice and water (1 l.) whereby the crude product precipitated. The crude product was purified by chromatography of a benzene solution of the crude product over a column of alumina. Evaporation of the eluate and recrystallization of the resulting residue from acetone gave 7-chloro - 1,3 - dihydro-1-(2-hydroxyethyl)-5-phenyl-2H - 1,4 - benzodiazepin-2-one as colorless prisms, M.P. 159–160°.

EXAMPLE 3

The sodium salt of 1,3-dihydro-7-nitro-5-phenyl-2H-1,4-benzodiazepin-2-one was prepared by dissolving 1,3-dihydro-7-nitro - 5 - phenyl-2H-1,4-benzodiazepin-2-one (0.10 mole) in 250 mls. of anhydrous dimethylformamide and thereafter adding 0.11 mole of solid sodium methoxide to the resultant solution. After heating the so-formed reaction mixture, with stirring and with protection from atmospheric moisture, on a steam bath for 15 minutes, there was then carefully added to the heated mixture over a period of about 30 minutes a solution of 2-bromoethanol (0.11 mole) in 200 mls. of anhydrous toluene. Stirring and heating on the steam bath was continued for a further 1½ hours and the resultant mixture was concentrated in vacuo at 50–60°. The resulting concentrated solution was poured slowly into a mixture of ice and water (1 l.) whereby crystalline 1,3-dihydro-1-(2-hydroxyethyl)-7-nitro - 5 - phenyl-2H-1,4-benzodiazepin-2-one-precipitated, M.P. 231–233° (dec.). Recrystallizations from ethanol and, finally, from acetone, gave colorless prisms of the product melting at 239–240° (dec.).

EXAMPLE 4

To 7 - chloro,1,3 - dihydro-1-phenacyl-5-phenyl-2H-1,4-benzodiazepin-2-one (12.0 grams, 30.8 millimoles) in 200 mls. of ethanol, there was carefully added sodium borohydride (1.29 grams, 33 millimoles) in small portions over a period of one hour. The mixture was stirred overnight and then concentrated in vacuo. The concentrate was poured into water. The so-formed aqueous medium was made basic with dilute sodium hydroxide solution and extracted with methylene chloride yielding 7-chloro-1,3 - dihydro - 1 - (β-hydroxyphenethyl)-5-phenyl-2H-1,4-benzodiazepin-2-one as a pale yellow gum.

The free base was dissolved in a slight excess over the calculated amount of methanolic 1 N hydrochloric acid. On addition of ether, 7-chloro-1,3-dihydro-1-(β-hydroxyphenethyl) - 5 - phenyl - 2H - 1,4-benzodiazepin-2-one hydrochloride precipitated. Upon recrystallization from methanol-acetone, the hydrochloride was obtained as colorless needles, M.P. 216–217°.

The above-mentioned 7-chloro-1,3-dihydro-1-phenacyl-5-phenyl-2H-1,4-benzodiazepin-2-one and its manner of preparation do not constitute a part of the present invention but such is disclosed hereinbelow in order that the disclosure be complete.

0.100 mole of 7-chloro-1,3-dihydro-5-phenyl-2H-1,4-benzodiazepin-2-one was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of phenacyl bromide was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated, in vacuo, to a small volume and poured slowly into a large volume of ice water. A precipitate which formed was removed by filtration. Recrystallization of the precipitate from ethanol gave 7 - chloro - 1,3 - dihydro - 1-phenacyl-5-phenyl-2H-1,4-benzodiazepin-2-one as colorless prisms, M.P. 174–175°.

EXAMPLE 5

0.100 mole of 7 - chloro - 1,3-dihydro-5-phenyl-2H-1,4-benzodiazepin-2-one was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of 1-chloroacetone was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated in vacuo to a small volume and poured slowly into a large volume of ice water. A precipitate which formed was removed by filtration. Recrystallization of the precipitate from acetone gave 1 - acetonyl - 7 - chloro - 1,3-dihydro-5-phenyl-2H-1,4-benzodiazepin-2-one as colorless prisms, M.P. 169–171°.

The last-mentioned compound and its manner of preparation do not constitute a part of the present invention but such is disclosed herein in order that the disclosure be complete.

To a solution of 1 - acetonyl - 7 - chloro - 1,3-dihydro-5-phenyl-2H-1,4-benzodiazepin-2-one (20.0 g., 61 millimoles) in ethanol (250 ml.), there was carefully added sodium borohydride (2.55 g., 68 millimoles) in small portions over a period of one hour. The mixture was stirred overnight and then concentrated in vacuo. The resultant concentrate was poured into water, made basic with dilute sodium hydroxide solution and extracted with methylene chloride, yielding 7 - chloro - 1,3-dihydro-1-(β-hydroxypropyl) - 5 - phenyl - 2H - 1,4-benzodiazepin-2-one as a yellow gum.

The free base was dissolved in a slight excess over the calculated quantity of 1 N-hydrochloric acid. Addition of ether precipitated 7 - chloro - 1,3-dihydro-1-(β-hydroxypropyl) - 5 - phenyl - 2H-1,4-benzodiazepin-2-one hydrochloride. Upon recrystallization from methanol-acetone-ether, the hydrochloride was obtained as yellow prisms, melting point 203–205°.

EXAMPLE 6

To a solution of 0.10 mole of 7-chloro-1,3-dihydro-5-phenyl-2H-1,4-benzodiazepin-2-one in 250 ml. of anhydrous dimethylformamide, there was added 0.11 mole of solid sodium methoxide. After heating the reaction mixture on a steam bath with stirring for 15 minutes and with protection from atmospheric moisture, there was carefully added thereto a solution of β-bromoethyl ethyl ether (0.11 mole) in 200 ml. of anhydrous toluene over a period of about 30 minutes. Stirring and heating on the steam bath was continued for a further 1½ hours and then the resultant mixture was concentrated in vacuo at 50–60°. The resulting concentrated solution was poured slowly into a mixture of ice and water (1 l.) whereby the crude product precipitated. The crude product was purified by chromatography of a benzene solution of the crude product over a column of "Woelm" activity III neutral alumina. Evaporation of the eluate and recrystallization of the resulting residue from benzene-hexane (1:1) gave 7-chloro-1,3-dihydro - 1 - (2 - ethoxyethyl) - 5 - phenyl-2H-1,4-benzodiazepin-2-one as white cubes, melting point 156–158°.

The monohydrochloride of 7-chloro-1,3-dihydro-1-(2-ethoxyethyl)-5-phenyl - 2H-1,4 - benzodiazepin-2-one was prepared by dissolving the base as prepared above in a small amount of methanol, followed by addition of methanolic 2 N-hydrochloric acid (1.2 equivalents) and dilution of the solution with acetone. Recrystallizations from methanol-acetone (with addition of a small amount of methanolic hydrochloric acid before each recrystallization) gave the hydrochloride as colorless prisms, melting point 212–214° (dec).

EXAMPLE 7

A parenteral formulation containing per ml. 7-chloro-1,3-dihydro-1-(β-hydroxypropyl)-5-phenyl - 2H - 1,4-benzodiazepin-2-one hydrochloride, 1.0 mg.; N,N-dimethylacetamide, 0.1 cc.; ethanol, 0.1 cc.; benzyl alcohol, 0.15 cc.; water for injection qs. add, 1 ml. was prepared as follows:

Dissolve the active component in the N,N-dimethylacetamide, warming slightly to facilitate solution. When solution has been affected, add the benzyl alcohol and the ethanol and slowly add the "water for injection" with constant stirring and bring to volume. Filter the solution through a fine sintered glass filter and fill into flint or amber ampuls of desired size. Gas with nitrogen and seal. All steps after filtration should be done under aseptic conditions.

EXAMPLE 8

A capsule containing 7-chloro-1,3-dihydro-1-(β-hydroxypropyl)-5-phenyl-2H - 1,4 - benzodiazepin-2-one hydrochloride, 5 mg.; lactose, 163 mg.; corn starch, 37 mg.; talc, 5 mg. was prepared as follows:

Mix the active component with lactose and corn starch in a suitable mixer. Further blend the mixture by passing through a Fitzpatrick Comminuting Machine with a No. 1A screen with knives forward. Return the blended powder to the mixer, add the talc and blend thoroughly. Fill into No. 4 hard shell gelatin capsules on a Parke, Davis or similar type capsulating machine.

EXAMPLE 9

A tablet containing 7-chloro-1,3-dihydro-1-(β-hydroxypropyl)-5-phenyl-2H-1,4-benzodiazepin-2-one hydrochloride, 10 mg.; lactose, 45 mg.; corn starch, 38 mg.; pregelatinized corn starch, 5 mg.; calcium stearate, 2 mg. was prepared as follows:

In a suitable mixer blend the active component with the lactose, corn starch and pregelatinized corn starch. Granulate the mixed powders with water to the consistency of a heavy paste and pass the moist mass through a No. 12 screen. Dry the moist granules on paper covered trays at 110° F. Pass the dried granules through a No. 16 mesh screen. Transfer the granules to a suitable mixer, add the calcium stearate and mix until uniform. Compress the granules at a tablet weight of 100 mg. using flat faced, beveled edge punches having a diameter of ¼.

EXAMPLE 10

A solution of 1-acetonyl-7-bromo-1,3-dihydro-5-(2-pyridyl)-2H-1,4-benzodiazepin-2-one (5.25 gm., 14 millimoles), in ethanol (80 ml.), was stirred at room temperature. Sodium borohydride (0.59 gm., 15.4 mm.) was carefully added to the stirred solution. The resulting solution was stirred for 16 hours at 25° C., concentrated in vacuo, and diluted with ice water (300 ml.). Excess aqueous 3 N sodium hydroxide solution was added (circa 5 ml.), and the mixture was extracted with methylene chloride. The extract was washed with water, dried over anhydrous sodium sulfate, and evaporated. The yellow solid which formed was dissolved in benzene and purified by filtration through a column containing "Woelm" neutral alumina, activity III. Elution with benzene and with mixtures of benzene and methylene chloride, and evaporation of the eluates, gave 7-bromo-1,3-dihydro-1-($\beta$-hydroxypropyl)-5-(2-pyridyl) - 2H - 1,4 - benzodiazepin-2-one. The product crystallized from ether-petroleum ether as colorless needles, M.P. 126–128°.

The above-mentioned 1-acetonyl-7-bromo-1,3-dihydro-5-(2-pyridyl)-2H-1,4-benzodiazepin-2-one and its manner of preparation does not constitute a part of the present invention but such is disclosed herein below in order that the disclosure be complete.

To a solution of 7-bromo-1,3-dihydro-5-(2-pyridyl)-2H-1,4-benzodiazepin-2-one (10 gm., 31.8 millimoles), in anhydrous N,N-dimethylformamide (150 ml.), was added sodium methoxide (1.85 gm., 35 millimoles). The reaction mixture was stirred for a period of 4 hours at room temperature. A small amount of finely powdered sodium iodide (circa 50–100 mg.) was added, followed by the dropwise addition of a solution of chloroacetone (2.9 ml., 3.3 g., 35 millimoles), in anhydrous N,N-dimethylformamide (20 ml.) over a period of 30 minutes. The mixture was first stirred for 20 hours at 25°, then for 4 hours at 45°, and thereafter was poured into ice water (1.7 liters). The product was recovered by extraction with methylene chloride, and the dried extract was further purified by filtration through a column containing 50 gm., of "Woelm" grade III neutral alumina. Evaporation of the eluates gave 1-acetonyl-7-bromo-1,3-dihydro-5-(2-pyridyl)-2H-1,4-benzodiazepin - 2 - one as a pale yellow gum, which was further purified by extraction with mixtures of benzene and hexane. Evaporation of the extracts gave a pale yellow gum, which was recrystallized from methylene chloride-hexane giving the product as colorless prisms, M.P.: 156–158°.

We claim:

1. A compound selected from the group consisting of a compound of the formula

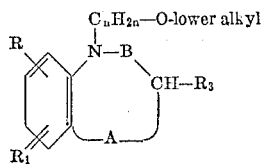

a compound of the formula

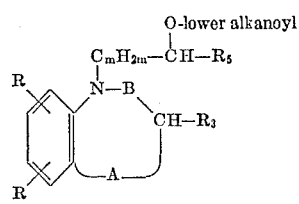

a compound of the formula

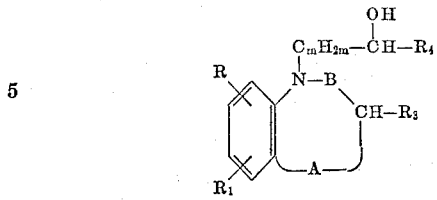

and acid addition salts thereof with pharmaceutically acceptable acids wherein A is selected from the group consisting of

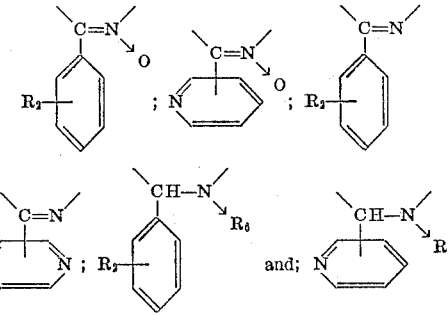

B is selected from the group consisting of carbonyl; $n$ is a whole integer from 2–7; $m$ is a whole integer from 1–7; R, $R_1$ and $R_2$ are selected from the group consisting of halogen, hydrogen, nitro, trifluoromethyl, lower alkyl, amino and cyano; $R_3$ is selected from the group consisting of hydrogen and lower alkyl; $R_4$ is a member selected from the group consisting of lower alkyl and $R_7$-phenyl wherein $R_7$ is a member selected from the group consisting of hydrogen, halogen, lower alkoxy, trifluoromethyl, nitro, lower alkyl and amino; $R_5$ is a member selected from the group consisting of hydrogen, lower alkyl and $R_7$-phenyl wherein $R_7$ is as above and $R_6$ is a member selected from the group consisting of hydrogen and lower alkyl.

2. 1,3 - dihydro-1-(lower alkyl-O-$C_nH_{2n}$)-7-$R_1$-5-($R_2$-phenyl)-2H-1,4-benzodiazepin-2-one wherein $n$ is a whole integer from 2–7 and $R_1$ and $R_2$ are selected from the group consisting of hydrogen, halogen, trifluoromethyl, nitro, lower alkyl, amino and cyano.

3.

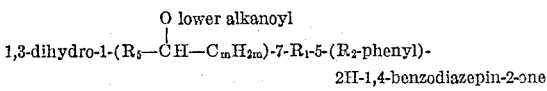

wherein $R_1$ and $R_2$ are selected from the group consisting of hydrogen, halogen, trifluoromethyl, nitro, lower alkyl, amino and cyano; $m$ is a whole integer from 1–7 and $R_5$ is selected from the group consisting of hydrogen, lower alkyl and $R_7$-phenyl wherein $R_7$ is selected from the group consisting of hydrogen, halogen, lower alkoxy, trifluoromethyl, nitro, lower alkyl and amino.

4.

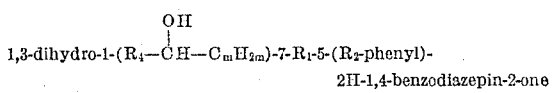

wherein $m$ is a whole integer from 1–7, $R_1$ and $R_2$ are selected from the group consisting of halogen, hydrogen, trifluoromethyl, nitro, lower alkyl, amino and cyano and $R_4$ is selected from the group consisting of lower alkyl and $R_7$-phenyl wherein $R_7$ is a member selected from the group consisting of hydrogen, halogen, lower alkoxy, trifluoromethyl, nitro, lower alkyl and amino.

5. 7 - halo-1,3-dihydro-1-[phenyl(hydroxy lower alkyl)]-5-phenyl-2H-1,4-benzodiazepin-2-one.

6. 7 - chloro - 1,3-dihydro-1-($\beta$-hydroxyphenethyl)-5-phenyl-2H-1,4-benzodiazepin-2-one.

7. 7 - chloro - 1,3 - dihydro-1-($\beta$-hydroxypropyl)-5-phenyl-2H-1,4-benzodiazepin-2-one.

8. 7-halo-1,3,-dihydro-1-(lower alkoxy lower alkyl)-5-phenyl-2H-1,4-benzodiazepin-2-one.

9. 7-chloro-1,3-dihydro-1-(2-ethoxyethyl)-5-phenyl-2H-1,4-benzodiazepin-2-one.

10. 7-bromo-1,3-dihydro-1-(β-hydroxypropyl)-5-(2-pyridyl)-2H-1,4-benzodiazepin-2-one.

11. 7-halo-1,3-dihydro-1-[lower alkyl(hydroxy lower alkyl)]-5-(2-pyridyl)-2H-1,4-benzodiazepin-2-one.

12. 7-halo-1,3-dihydro-1-[lower alkyl(hydroxy lower alkyl)]-5-phenyl-2H-1,4-benzodiazepin-2-one.

References Cited

UNITED STATES PATENTS 3,236,838  2/1966  Archer et al. _____ 260—239.3

JOHN D. RANDOLPH, *Primary Examiner.*

WALTER A. MODANCE, *Examiner.*

R. T. BOND, *Assistant Examiner.*

UNITED STATES PATENT OFFICE
CERTIFICATE OF CORRECTION

Patent No. 3,391,138                              July 2, 1968

Giles A. Archer et al.

It is certified that error appears in the above identified patent and that said Letters Patent are hereby corrected as shown below:

Column 1, line 18, "radic" should read -- radical --; line 42 to 48, formula Ia should appear as shown below:

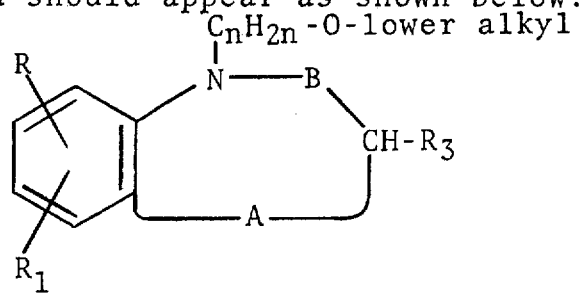

same column 1, lines 51 to 58, formula Ib should appear as show below:

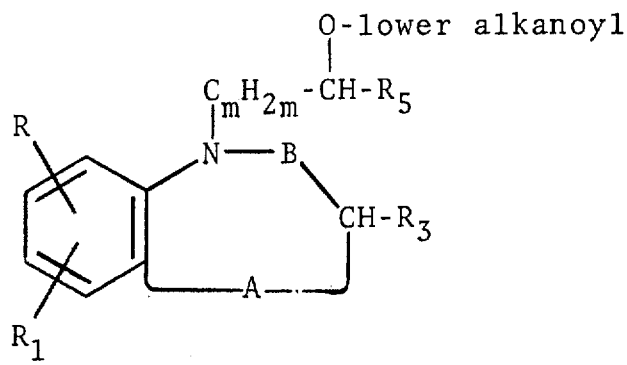

same column 1, lines 62 to 69, formula Ic should appear as show below:

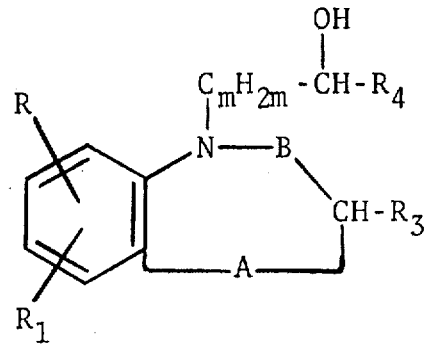

(2)

Column 2, line 71, "1-one" should read -- 2-one --. Column 3, line 3, "7-R" should read -- 7-$R_1$ --. Column 4, line 67, "position-1 of the formula" should read -- position-1 of compounds of the formula --. Column 6, line 17, "(3-hydroxyropy) should read -- (3-hydroxypropyl) --; line 68, "1.29 grams" should read -- 1.20 grams --. Column 9, lines 55 to 60, the left-hand portion of the formula should appear as shown below:

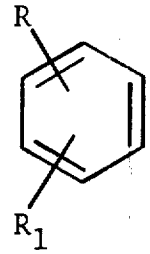

same column 9, lines 67 to 75, the left-hand portion of the formula should appear as shown below:

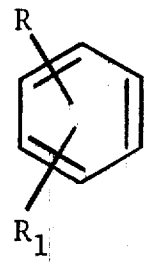

Signed and sealed this 30th day of December 1969.

(SEAL)
Attest:

EDWARD M. FLETCHER, JR.
Attesting Officer

WILLIAM E. SCHUYLER, JR.
Commissioner of Patents